United States Patent
Kennamer

(10) Patent No.: US 8,600,693 B1
(45) Date of Patent: Dec. 3, 2013

(54) WIRELESS TEMPERATURE PROBE CALIBRATION SYSTEM AND METHOD

(75) Inventor: Jack J. Kennamer, Maineville, OH (US)

(73) Assignee: The Veracity Group, Inc., Maineville, OH (US)

( * ) Notice: Subject to any disclaimer, the term of this patent is extended or adjusted under 35 U.S.C. 154(b) by 523 days.

(21) Appl. No.: 12/954,027

(22) Filed: Nov. 24, 2010

Related U.S. Application Data

(60) Provisional application No. 61/263,913, filed on Nov. 24, 2009.

(51) Int. Cl.
*G01K 15/00* (2006.01)

(52) U.S. Cl.
USPC .................................. 702/99; 702/130; 374/1

(58) Field of Classification Search
USPC ............................ 702/99, 130–136; 374/1, 3; 340/584–586
See application file for complete search history.

(56) References Cited

U.S. PATENT DOCUMENTS

| | | | |
|---|---|---|---|
| 6,646,567 B1 | 11/2003 | Olivas | |
| 6,794,990 B2 | 9/2004 | Tseng | |
| 7,484,887 B2 | 2/2009 | Shidemantle et al. | |
| 7,507,019 B2 | 3/2009 | Price | |
| 2005/0261991 A1* | 11/2005 | Kennamer | 705/28 |
| 2009/0296769 A1* | 12/2009 | Fiennes et al. | 374/1 |

* cited by examiner

*Primary Examiner* — Manuel L Barbee
(74) *Attorney, Agent, or Firm* — Wood, Herron, & Evans, LLP

(57) ABSTRACT

A monitoring, tracking, and calibration system tracks temperature data and the validity of temperature measuring devices. If an item is temperature sensitive, the system permits temperature readings to be taken by a remote transmitter or other temperature measuring device and stored by a computer. A calibration device is built into the remote transmitter or attached in line to a temperature sensor and include at least one fixed value. The remote transmitter samples that fixed value periodically or in response to an instruction from the computer. The computer, in turn, compares the fixed value to a respective expected value. If the comparison indicates that the fixed value compares favorably to the at least one respective expected value, the remote transmitter is considered calibrated and functioning correctly. Otherwise, the remote transmitter is considered faulty and an error is reported so that corrective action may be taken.

23 Claims, 3 Drawing Sheets

WIRELESS TEMPERATURE PROBE CALIBRATION SYSTEM AND METHOD

CROSS-REFERENCE TO RELATED APPLICATION

This claims the benefit of Provisional Patent Application Ser. No. 61/263,913 entitled "WIRELESS TEMPERATURE PROBE CALIBRATION SYSTEM AND METHOD" and filed on Nov. 24, 2009, which application is hereby incorporated by reference in its entirety herein.

FIELD OF THE INVENTION

This invention generally relates to temperature monitoring systems and devices, and more particularly, to a temperature monitoring and calibration system and device adapted to be used in the healthcare industry.

BACKGROUND OF THE INVENTION

Many items used in healthcare settings for patient treatment require storage, treatment and/or preparation at specified temperature or temperature range. For many years, the most common way of taking an item's temperature involved utilization of mercury thermometers. However, such thermometers are susceptible to breaking, releasing substances that often contaminate whatever surfaces they come into contact with. Items, such as those in laboratories, pharmacies, and other areas in a healthcare setting require regular, systematic, and reliable temperature monitoring. These items may include pharmacy refrigerators or freezers containing medications and supplements, blanket warmers, patient and treatment rooms, hot and cold holding units, cryogenic equipment and other items.

Because of the drawbacks of conventional thermometers, electronic thermometers were developed and are now in widespread use. Although electronic thermometers provide relatively more accurate temperature readings than traditional techniques, they nevertheless share many of the same drawbacks. For example, even though electronic thermometers provide faster readings, they must still pass periodic calibration checks before an accurate reading can be taken. Typically, electronic temperature sensors and other thermometers require calibration at the factory during manufacturing in order achieve the quick and accurate temperature reading capability noted above. Unfortunately, known techniques for field calibrating electronic thermometers fail to account for differences (e.g., manufacturing differences, altitude, etc.) in reference temperature sensors and assume that each of the reference temperature sensors responds in the same manner to a given input. Other known techniques may also rely upon the calibration of the primary temperature sensor to provide sufficiently accurate data to extract parameters of the reference temperature sensor.

The proper use and handling of healthcare items requires a constant monitoring of their temperature and/or the temperature of the ambient air in which they are being stored, for example, in medical refrigerators. The collection and maintenance of temperature data is accomplished using various instruments and is generally very labor intensive. For example, it is known to use inspectors who carry portable temperature data collection devices that include a temperature measuring sensor and a data storage device, for example, a digital processor with memory that maintains a digital record of the temperatures measured. The inspectors use the temperature sensor to measure the temperature of the items at different times and at different stages of the handling, preparation and implementation processes. Historical temperature records are kept either manually or are entered into a computer for storage and reporting. Also for example, there are known devices for measuring temperatures and automatically recording those temperatures on a paper chart; however, such devices have relatively limited applications and require additional expenses and maintenance. At a minimum, the temperature data is collected manually and logged on paper temperature sheets attached to each piece of equipment that requires monitoring. But this prevents dynamic analysis of that equipment and again requires labor intensive maintenance.

Recommended temperatures and procedures in healthcare settings and preparation processes are set forth according to State and Federal laws and other regulatory agencies. The calibration procedures are set by the National Institute of Standards and Technology (NIST), which is a federal agency that develops and promotes temperature management standards. Implementation of NIST standards and associated data collection, however, is also very labor intensive and can be prone to errors. Thus, there is a need for a convenient method and system for tracking temperatures of items at different locations and providing a historical temperature record of the item in a healthcare setting and assuring that the temperatures are accurate.

Moreover, conventional methods for calibration of electronic thermometers often utilize temperature-controlled water or other liquid bath to control the temperature of the thermometer, or its components, during calibration. Because know calibration methods require and the temperature instruments to be collected and brought back to the know calibration source it requires extensive labor and time to located, collect, calibrate, log the calibration data, and return the instrument back to its location. This process can take hours if not days or weeks depending on the number of temperature instruments to be calibrated.

One conventional system includes a wireless transmitter that takes temperatures in the healthcare market and must be tested periodically for accuracy. The tests are conducted to a NIST standard by using an oil or liquid bath or hand held fixed value electronic temperature transmitter to provide a single reference or comparable temperature. Some such systems use multiple temperature points to assure accuracy across the temperature range of the sensor, adding an even higher level of complexity. Such calibration systems are very difficult, cumbersome and time consuming to use, especially when a particular healthcare institution has hundreds or more temperature sensors to individually and manually maintain, check, calibrate and re-calibrate.

Accordingly, an improved method for calibrating a reference temperature sensor of a thermometer or temperature sensing instrument in a healthcare or other setting is needed.

SUMMARY OF THE INVENTION

Embodiments of the invention provide a monitoring, tracking and calibration system that permits a user to have accurate and immediate access to temperature data, its history, and current status and calibration parameters. If the item is temperature sensitive, the monitoring and tracking system utilized with embodiments of the invention permits temperature readings to be easily taken and stored. Measured temperatures that are out of a desired range are immediately reported so that corrective action may be taken. The monitoring and tracking system is very flexible, easily calibrated and can be structured to the user's needs. Thus, with more efficient use of the operator's time and skills, operating costs can be substantially reduced. The monitoring, tracking and calibration system may be especially useful in the healthcare industry.

In accordance with the principles of the invention and the described embodiments, the invention provides wireless transmitter sensors that can be installed on a device, such as a refrigerator, to collect temperatures as frequently as every minute. The temperature data is transferred to a computer and/or database where it is automatically analyzed for out of range temperatures. Upon detection of an out of range temperature, the computer automatically sends out alerts to appropriate personnel for action. Within the transmitter there is an embedded calibration routine. It is important to maintain and validate system accuracy and calibration. The transmitter has several, for example four, fixed resistors that represent known temperature values. The resistors are fixed and cannot change their resistance value. Whenever the user wishes to validate the transmitter accuracy he would simply login to the system software and chose one transmitter, a group of transmitters, or the entire system. The system then sends a command to the wireless transmitter(s) instructing them to go into calibration mode. The transmitter then samples the fixed resistors as if they were actual temperature probes. The values are the sent back to the computer wirelessly where they are compared to the anticipated/known values. If all the values are within the acceptable/expected range, which may not be greater than approximately +/−0.2% of the known value and thus corresponds to a temperature within approximately +/−0.01° F., the transmitter is deemed accurate and functioning properly. If one of the temperature samples is not within its respective range, the system determines that the transmitter is malfunctioning and notifies the user that it needs to be replaced. The system automatically tracks and maintains records of each validated test for industry compliance. Additionally, the system can be set to automatically perform these tests on a scheduled basis, e.g., daily, weekly, monthly, quarterly, etc., or whenever the user wishes to maintain their standards. In an automatic mode, the system generates an alert if a transmitter is found not to be in spec and identifies the specific transmitter and automatically notifies the user of the malfunctioning transmitter.

In another embodiment of the invention, the above data collector is connected to a computer via at least one communication link. Thus, the measured temperature and calibration status are transferred to the computer for analysis and storage. In one aspect of this embodiment, the communication link includes a wireless communication link.

A further embodiment of the invention provides a method of tracking temperatures of an item in which identity data identifying the item is created and a temperature value of the item is measured with a temperature measuring device. Next, the temperature value of the item is transmitted to a computer and stored in association with the identity data, so that a record of the temperature of the item is maintained. In one aspect of this embodiment, the temperature of the item is measured with a hand-held data collector. Thus, the monitoring and tracking system of this invention has the advantages of continuously, very accurately, and reliably monitoring and tracking temperatures in association with an item which heretofore was only performed manually.

In another aspect of some embodiments of the invention, a calibration device is built into the transmitter or attached in line to the temperature sensor. The calibration device includes a component that has fixed values that correspond to known readings or temperatures. The calibration device then sends a signal to the temperature sensor device instructing it to sample the fixed values. If the data comes back correctly then the device is calibrated and functioning correctly. The device could be programmed to sample automatically on a regular interval and send the data. In this way the entire process to calibrate the system, such as per NIST standards, is automated without ever having to go to, manually travel to, test, or calibrate, the individual transmitters. The device could be a circuit built on the circuit board of the transmitter or a standalone item that is attached to the transmitter.

Various additional advantages, objects and features of the invention will become more readily apparent to those of ordinary skill in the art upon consideration of the following detailed description of the presently preferred embodiments taken in conjunction with the accompanying drawings.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
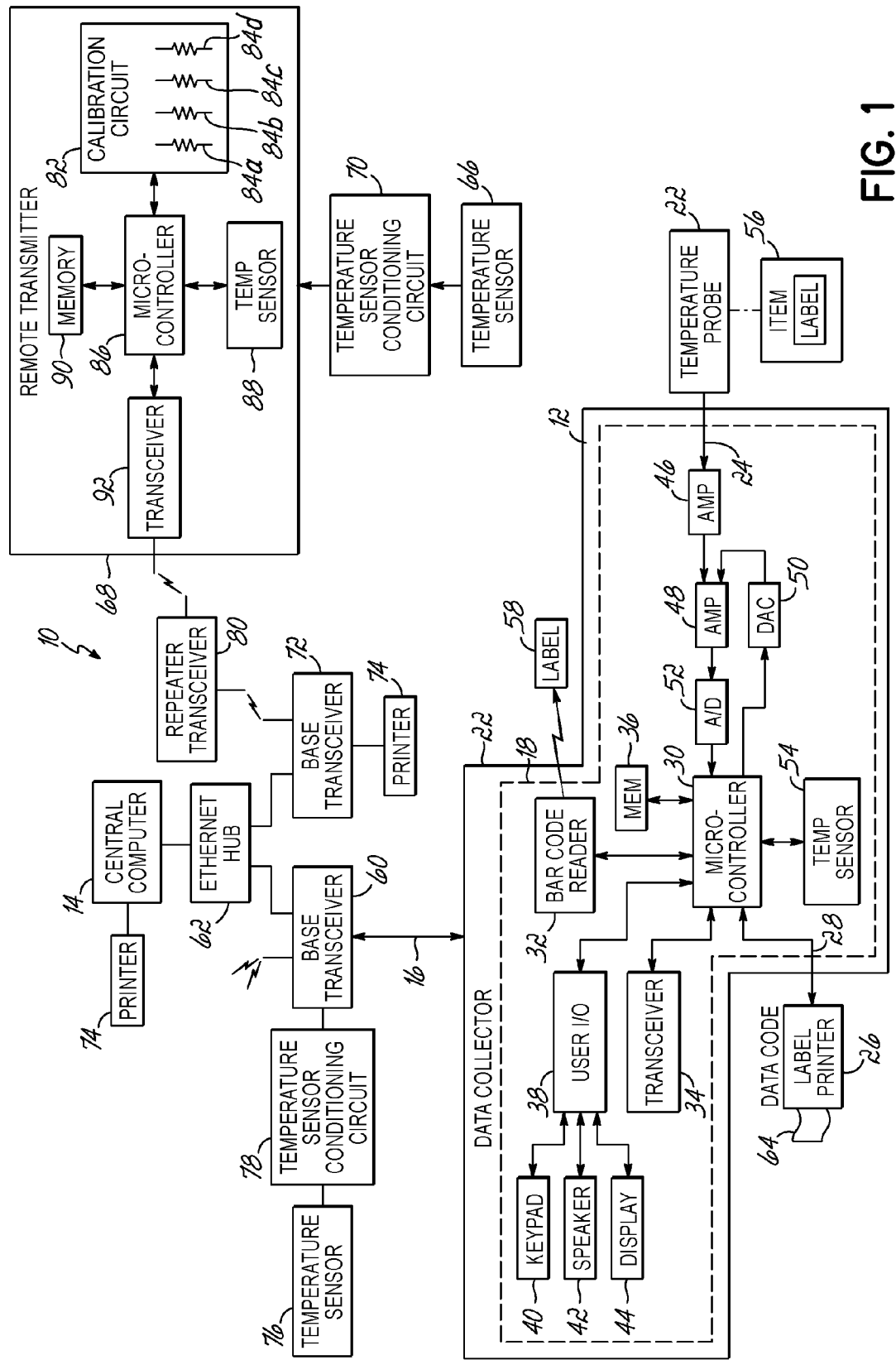
FIG. 1 is a schematic block diagram of a portable, hand-held data collection system in accordance with the principles of this invention that includes a computer and a remote transmitter that acts as a temperature sensing device.

FIG. 1 illustrates one embodiment of a monitoring and tracking system 10 for use in this invention that includes a portable hand-held data collector 12, a central computer 14, and a communication link 16 therebetween. The data collector 12 comprises a main body 18 including a pistol grip, a temperature sensing probe 22 electrically connected to the data collector 12 via a communication link as at 24, and a printer 26 electrically connected to the data collector 12 via a communication link 28. The data collector 12 also includes a processing unit, such as a microcontroller 30, which in specific embodiments may be an 8 bit PIC microcontroller. The microcontroller 30 is in electrical communication with a reader 32, such as a bar code reader, and a communication unit 34, such as a wireless transmitter/receiver, or, more simply, a transceiver 34. In one embodiment, the transceiver 34 may operate to transmit data using the IEEE 802.11 standard. Alternatively or additionally, the transceiver 34 may operate to transmit data in the UHF range, and in particular may be a line-of-sight 900 MHz transceiver. In some embodiments, the transceiver 34 uses two transmitters that transmit signals in two different frequencies, such as 906 MHz and 915 MHz. As such, the microcontroller 30 may initiate communication using one transmitter; however, if a link cannot be established, the microcontroller 30 may then initiate communication with the second transmitter. The output of each transmitter is amplified and filtered in an LC filter in a known manner prior to feeding to a respective antenna. The transceiver 34 and all other transceivers in the system comply with FCC regulations. In still further embodiments, the transceiver 34 may be electrically connected to the base transceiver 60 through the communication link 16 via a cable, such as an Ethernet cable.

In addition to its internal memory, the microcontroller 30 is connected to memory 36 which may be a nonvolatile memory such as EEPROM memory. The microcontroller 30 is also in electrical communication with at least one user input/output ("I/O") device 38. The at least one user I/O device 38 can include a user input device, such as a pushbutton and/or keypad 40, or an output device, such as an audio sound generator 42 or a display 44, such as an LCD screen, etc. The keypad 40 normally has a set of keys or pushbuttons that in a known manner have alpha/numeric or functional identities.

The temperature probe 22 and the other temperature sensors identified herein may detect temperature is several different ways. For example, the temperature probe 22 may be a temperature sensing integrated circuit device, a resistance-measuring temperature device (such as a thermistor), a voltage-measuring temperature device (such as a thermocouple), or a radiated energy-measuring temperature device (such as an infrared detector), to name a few examples. In one specific embodiment, the temperature probe 22 includes a thermocouple to detect changes in the temperature of an item. As such, An analog temperature signal from the temperature probe 22 is amplified by an analog operational amplifier ("op amp") 46. A second op amp 48 operates with a digital to analog converter ("DAC") 50 to provide an analog signal to an analog to digital ("A/D") converter 52 that is within the range of the A/D converter 52. The operation of the DAC 50 and op amp 48 permit the relatively narrow magnitude range of the A/D converter 52 to accommodate the much wider magnitude range of the amplified output signal from the temperature probe 22.

In operation, when the microcontroller 30 samples the output from the A/D converter 52 and determines that the output is saturated or at its maximum value, the microcontroller 30 provides a known value to the DAC 50 which functions to offset or reduce the magnitude of the analog signal output from the op amp 48 by a fixed amount. The microcontroller 30 then re-samples the output from the A/D converter 52; and if it is still at a maximum, the microcontroller 30 increments the magnitude of the signal to the DAC 50 by another fixed amount. That process continues until the microcontroller 30 detects that the output from the A/D converter 52 is no longer saturated. The microcontroller 30 then stores the output from the A/D converter 52 with the amount of offset that it provided to the DAC 50.

The microcontroller 30 also samples a temperature reading from a second temperature sensor 54 configured to sense an ambient temperature. The temperature sensor 54 can also be implemented with several known temperature detection devices, and, in various embodiments, may also be a temperature sensing integrated circuit device, thermistor, thermocouple, or infrared detector. Given the ambient temperature measurement and the measurement from the temperature probe 22, the microcontroller 30 calculates the temperature value of the item 56. The microcontroller 30 then provides commands to the transceiver 34 to transfer the calculated temperature value of the item to the central computer 14 via the communication link 16.

In response to user input commands via the keypad 40, the microcontroller 30 may operate the bar code reader 32 to read a label 58 associated with the item 56. Automatically, at appropriate times, or in response to instructions from the user via the keypad 40, the microcontroller 30 transfers data over the communication link 16 to the central computer 14. The communication link 16 is established between the transceiver 34 and a base transceiver 60, which may send data received from the data collector 22 to an Ethernet hub 62 or port. In addition, in response to user instructions provided via the keypad 40, the microcontroller 30 commands the operation of the bar code label printer 26 which prints bar code labels 64 as required. The main body of the data collector 12, including the keypad 40 and bar code reader 32, are commercially available from Symbol Technology of Holtsville, N.Y.

In addition to the temperature probe 22 of the data collector 12, other temperature measuring devices may be used to monitor temperatures during the storage, handling, and use of the item 56. A temperature measuring device, such as a temperature sensor 66, is often permanently located in association with a storage device, for example, a freezer, a deep chiller, a refrigerator, etc. A sensor identical to the temperature sensor 66 may also be used to measure temperature in other settings or environments. In a specific embodiment, the temperature sensor 66 includes a thermocouple connected to a remote transmitter 68, or other temperature measuring device, via a temperature sensor conditioning circuit 70. The conditioning circuit 70 is comprised of circuits identical to the op amps 46, 48, DAC 50, and A/D converter 52 within the data collector 12 and operate as previously described. While only a single temperature sensor 66 is illustrated as being connected to the remote transmitter 68, as will be appreciated the remote transmitter 68 may be designed to be connected to and service a plurality of temperature sensors 66 each with its own temperature sensor conditioning circuit 70.

The remote transmitter 68 includes a processing unit, such as a microcontroller 86, an ambient temperature sensor 88, and a memory 90 similar to the microcontroller 30, temperature sensor 54 and memory 36 of the data collector 12, respectively. The microcontroller 86 may operate in a manner similar to microcontroller 30 previously described. As such, the microcontroller 86 is configured to automatically measure the temperature of the item which is in a heat conducting/radiating relationship with the temperature sensor 66. Moreover, the microcontroller 86 is configured to automatically transmit, via transceiver 92, the measured temperature value and other data to a base transceiver 72 which, in turn, transmits the data to the central computer 14 via an Ethernet hub 62. The measured temperature value is stored in the central computer 14 with a time and date stamp. In addition, with that data, the remote transceiver 68 also transmits a code identifying the remote transceiver 68 as well as the most recent measurement from the ambient temperature sensor 88.

The base transceivers 60, 72 used in the system 10 each include a microcontroller (not shown) and a transceiver unit (not shown) similar to the microcontrollers 3o, 86 and transceivers 34, 92. However, the base transceivers 60, 72 also communicate with an Ethernet port and may include a serial communications port (not shown) to connect to another device, such as a printer 74. To support those additional functions, each base transceiver 60, 72 may include a second processing unit (not shown) and memory (not shown) in electrical communication with the microcontroller. This additional processing unit may manage Ethernet communications as well as manage other higher level protocols, such as those used for controlling the printer 74. Alternatively, a temperature sensor 76 and temperature sensor conditioning circuit 78 may be connected directly to a base transceiver 60. In a specific embodiment, the temperature sensor 76 is a thermocouple. As such, the temperature sensor conditioning circuit 78 is substantially identical to the temperature sensor conditioning circuit 70. The microcontroller (not shown) in the base transceiver 60 may therefore be configured to sample a temperature value from the temperature sensor 76 and transmit that value to the central computer 14 in a similar manner as previously described with respect to the operation of the microcontroller 30, 86.

The transceivers 34, 92 may be wireless transceivers which have a limited range. As such, it may be necessary to use one or more relay devices, such as a repeater 80, to transmit signals from the remote transmitter 68 or the data collector 12 to a base transceiver 60, 72 for subsequent communication to the central computer 14. The repeater 80 is a relatively short range repeater transceiver configured to receive and transmit signals from one or more of the transceivers 34, 92 previously described. Alternatively, any of the transceivers 34, 92 may be wired transceivers that are electrically coupled, and communicate with, the respective base transceivers 60, 72 through respective cables, such as Ethernet cables.

As previously described, many of the item locations, for example, chillers, refrigerators, etc., have dedicated temperature sensors for measuring the temperature maintained by the storage unit. Further, it is generally desirable that the item associated with that location is maintained within a predetermined temperature range or at about the same temperature. As such, the computer 14 is configured to receive temperature measurements from the temperature probe 22 and/or temperature sensors 54, 66, 76, 88 to determine if temperatures measured thereby are out of a predetermined range. The temperature measurements, in turn, may be received from the data collector 22 (e.g., temperatures measured by the temperature probe and/or the temperature sensor 54), the base transceiver 60 (e.g., temperatures measured by the temperature sensor 76), and/or the remote transmitter 68 (e.g., temperatures measured by the temperature sensor 66 and/or the temperature sensor 88). The temperature measurements may be taken by the temperature probe 22 and/or temperature sensors 54, 66, 76, 88 on a scheduled basis, e.g., daily, weekly, bi-weekly, monthly, or in response to a command from the computer 14 requesting such temperature measurements.

In any event, received temperature measurements are stored by the computer 14 in a sensor temperature table that chronologically lists a digital code identifying the data collector 12, base transceiver 60, and/or remote transmitter 68 to which the temperature probe 22 and/or temperature sensor 54, 66, 76, 88 that measured the temperature is connected. Moreover, the computer 14 stores the port to which the temperature probe 22 and/or temperature sensor 54, 66, 76, 88 is connected, the time and date stamp when the temperature was taken, the time and date stamp when the temperature was received by the computer, the location at which the temperature was taken, the measured temperature value, and/or the acceptable temperature range, to name a few examples.

In some embodiments of the invention, a calibration device 82 is included in the remote transmitter 68. The calibration device 82 includes fixed values that correspond to known readings or temperatures and is accessed in an embedded calibration routine. Upon detection of an out of range temperature, the system 10,au automatically send out alerts to appropriate personnel for action. The calibration device 82 includes several, for example, four, fixed resistors 84a-84d that represent known temperature values. The resistors 84a-84d are fixed and cannot change their resistance value. Whenever the user wishes to validate the accuracy of the remote transmitter 68, they login to the computer 14 and chose one remote transmitter 68, a group of remote transmitters 68, or all the remote transmitters 68 for the system 10. The computer 14 then transmits a command to the selected wireless transmitter(s) 68 instructing them to enter a calibration mode. The remote transmitter 68 then samples the fixed resistors 84a-84d as if they were actual temperature sensing components. These values are transmitted back to the computer 14 where they are compared to the anticipated values. If the values are within the acceptable/expected range, which may not be greater than approximately +/−0.2% of the known value and thus correspond to a temperature within approximately +/−0.01° F., the remote transmitter 68 is deemed accurate and functioning properly. If one of the values is not within its respective range, the computer 14 determines that the remote transmitter 68 is malfunctioning and notifies the user that it needs to be replaced. The system 10 automatically tracks and maintains records of each validated test for industry compliance.

The system 10 may be configured to automatically perform a calibration process on selected remote transmitters 68 on a scheduled basis, e.g., daily, weekly, bi-weekly, monthly, and send the data. In this way the entire process to calibrate the system 10 per NIST standards is automated without having to send a technician to the remote transmitters 68 for manual calibration thereof. In some embodiments, the calibration device 82 is a circuit incorporated into the remote transmitter 68. Alternatively, the calibration device 82 may be configured as a standalone item that is attached inline between the temperature sensor 66 and the remote transmitter 68. When attached inline, the remote transmitter 68 is configured to detect that calibration device 82. The remote transmitter 68 may then automatically perform a calibration process with the calibration device 82 or, alternatively, perform a calibration process in response to a command sent from the computer 14. A temperature tracking system is disclosed in U.S. Patent Application Publication No. 2005/0261991, hereby incorporated by reference in its entirety, which may be utilized in this invention. Other systems 10 may also be utilized with embodiments of the invention, including one marketed as TempTrak™ by Cooper-Atkins (www.cooper-atkins.com).

The calibration process and calibration device 82 are utilized to determine whether the remote transmitter 68 is functioning properly. For example, a measured value outside the expected value for the resistors 84a, 84b, 84c, 84d may indicate that the remote transmitter 68 is no longer able to accurately measure resistances. This, in turn, may indicate that the remote transmitter 68 is no longer able to accurately sample temperatures, and thus that the remote transmitter 68 should be replaced.

A person having ordinary skill in the art will recognize that the environments illustrated in FIG. 1 are not intended to limit the scope of embodiments of the invention. In particular, the components of the system 10, such as the data collector 12 and the remote transmitter 68, may include fewer or additional components consistent with alternative embodiments of the invention. As such, other alternative hardware and software environments may be used without departing from the scope of embodiments of the invention The routines executed to implement the embodiments of the invention, whether implemented as part of an operating system or a specific application, component, program, object, module or sequence of instructions executed by one or more data collectors 12, computers 14 remote transmitters 68, or other component of the system 10 will be referred to herein as a "sequence of operations," a "program product," or, more simply, "program code." The program code typically comprises one or more instructions that are resident at various times in various memory and storage devices in a computing system, and that, when read and executed by one or more micrcontrollers or processing units of components of the system 10, cause that component to perform the steps necessary to execute steps, elements, and/or blocks embodying the various aspects of the invention.

While the invention has and hereinafter will be described in the context of fully functioning computing systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical and tangible recordable type media such as volatile and nonvolatile memory devices, floppy and other removable disks, hard disk drives, optical disks (e.g., CD-ROM's, DVD's, etc.), among others.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 2:
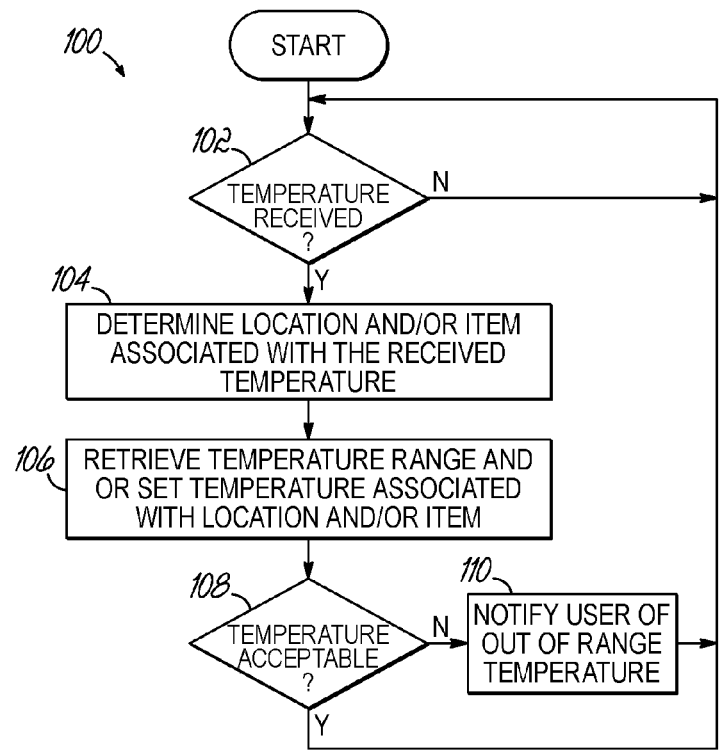
FIG. 2 is flowchart illustrating a sequence of operations for the computer of FIG. 1 to determine whether a received temperature value is too high or too low.

In some embodiments, the computer 14 is configured to determine whether a measured temperature from the data collector 12, base transceiver 60, and/or remote transmitter 68 indicates that there is a problem with an item and/or location. Thus, in response to receiving a measured temperature, the computer 14 may determine whether the measured temperature is outside a specified range, which may indicate that the item associated with that measure temperature needs to be moved or otherwise have the temperature at that location addressed. FIG. 2 is a flowchart 100 illustrating a sequence of operations for the computer 14 to receive and validate a measured temperature. In particular, the computer 14 determines whether a temperature from a data collector 12, base transceiver 60, and/or remote transmitter 68 has been received (block 102). When a temperature has not been received ("No" branch of decision block 102) the sequence of operations returns to block 102. However, when a temperature has been received ("Yes" branch of decision block 102), the computer 14 determines a location or item associated with that received temperature (block 104). In some embodiment, the location or item associated with the received temperature may be provided by the data collector 12, base transceiver 60, and/or remote transmitter 68 that transmitted the received temperature. For example, the data collector 12 may be used to scan an identification of the location and/or item associated with a measured temperature prior to or just after taking a temperature measurement, thus associating that location and/or item with the measured temperature. Alternatively, the location or time associated with the received temperature may be determined by the computer 14 based on which of a plurality of base transceivers 60 or remote transmitter 68 sent the received temperature. For example, the computer 14 may associate a temperature measurement received from the remote transmitter 68 with a particular location and/or item associated therewith.

When the computer determines the location and/or item associated with the received temperature (block 104), the computer 14 retrieves a temperature range and/or set temperature associated with the location and/or item (block 106). For example, once the location and/or item associated with a received temperature is known, the computer 14 determines what range or set temperature that location and/or item should maintained (e.g., such as from a database) and retrieves that range of temperatures or set temperature. The computer 14 then determines whether the received temperature is acceptable by comparing the received temperature to the range of temperatures or the set temperature (block 108). When the received temperature is outside the range of temperatures, or is above or below the set temperature by more than a predetermined threshold, the computer 14 determines that the temperature is not acceptable ("No" branch of decision block 108), and notifies the user of the out of range temperature (block 110), and the sequence of operations returns to block 102. However, when the received temperature is inside the range of temperature, or is above or below the set temperature by less than the predetermined threshold, the computer 14 determines that the temperature is acceptable ("Yes" branch of decision block 108), and the sequence of operations returns to block 102.

Figure 3:
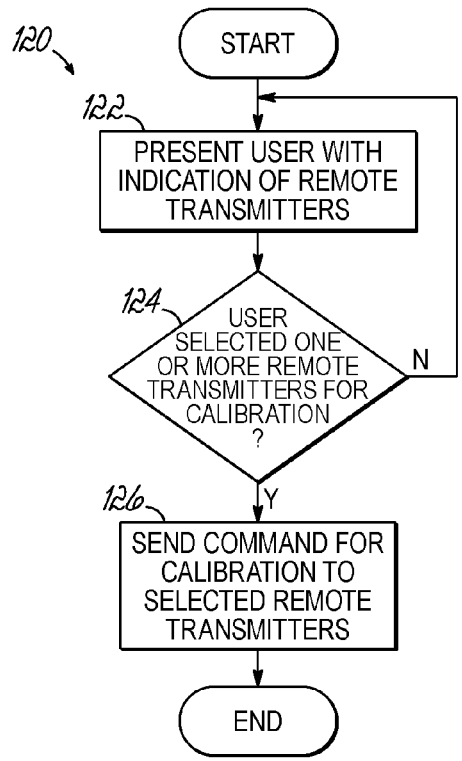
FIG. 3 is a flowchart illustrating a sequence of operations for the computer of FIG. 1 to select at least one remote transmitter to perform a calibration process.

FIG. 3 is a flowchart 120 illustrating a sequence of operations for a user of the computer 14 to select one or more remote transmitters 68 to calibrate. In particular, the computer 14 presents an indication of the remote transmitters 68 of the system 10 to the user in human detectable form (block 122) and determines whether the user has selected one remote transmitter 68, a group of remote transmitters 68, or all of the remote transmitters 68 of the system 10 for calibration (block 124). When the user has not selected at least one remote transmitter 68 ("No" branch of decision block 124), the sequence of operations may return to block 124. However, when the user has selected at least one remote transmitter 68 ("Yes" branch of decision block 124), the computer 14 sends a command to enter a calibration mode to the selected remote transmitters 68 (block 126).

Figure 4:
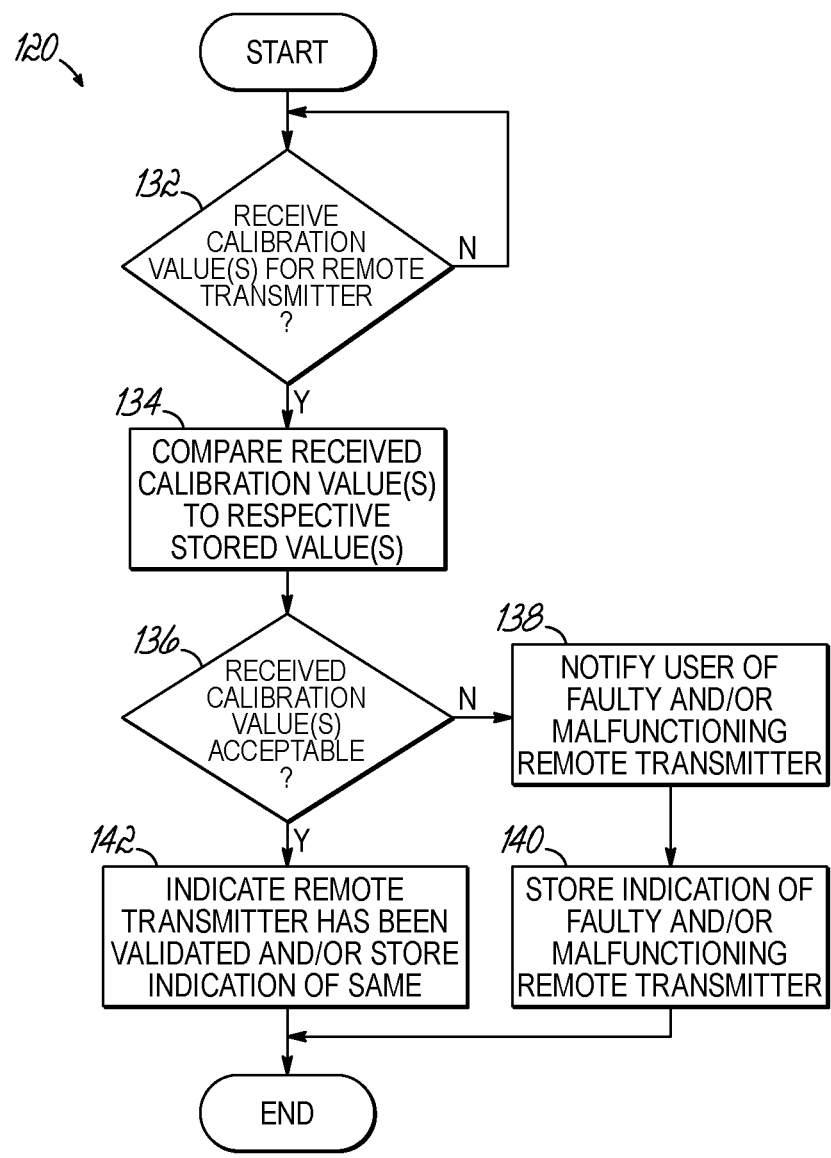
FIG. 4 is a flowchart illustrating a sequence of operations for the computer of FIG. 1 to determine whether at least one remote transmitter that performed a calibration process is faulty and/or otherwise malfunctioning.

In response to entering a calibration mode, the remote transmitters 68 sample one or more fixed values from the calibration device 82 and send those fixed values to the computer 14. The computer 14, in turn, compares those fixed, or "calibration", values to stored values for calibration and determines whether the remote transmitter 68 is faulty and/or malfunctioning based on that comparison. FIG. 4 is a flowchart 130 illustrating a sequence of operations for the computer 14 to receive one or more calibration values and determine, based on a comparison of the calibration values to respective stored values, whether a remote transmitter 68 associated with those calibration values is faulty and/or malfunctioning. In particular, the computer 14 initially determines whether it has received one or more calibration values (block 132). When the computer 14 has not received one or more calibration values ("No" branch of decision block 132), the sequence of operations returns to block 132. However, when the computer 14 has received one or more calibration values ("Yes" branch of decision block 132), the computer 134 compares the received calibration values to stored values that correspond to the values that the calibration values should be (block 134) and determines, based on the comparison, whether the calibration values are acceptable (block 136). For example, the computer 14 may compare the calibration values from a particular remote transmitter 68 to stored values that correspond to what the calibration values for that particular remote transmitter 68 should be. Thus, when the calibration values are within a predetermined range from the stored values, such as within a range of less than about 0.2% of the stored values, the calibration values are acceptable. When the calibration values are not acceptable ("No" branch of decision block 136), the computer 14 notifies the user that the remote transmitter 68 is faulty and/or malfunctioning (block 138) and stores an indication that the remote transmitter 68 associated with those unacceptable calibration values is faulty and/or malfunctioning (block 140). However, when the calibration values are acceptable ("Yes" branch of decision block 136), the computer indicates and/or stores an indication that the remote transmitter 68 associated with the acceptable values has been validated. The above illustrates various examples of how a monitoring and tracking system consistent with embodiments of the invention can be implemented and operated. In specific embodiments, the system 10 may include a computer 14 in communication with a plurality of remote transmitters 68. The remote transmitters 68 are configured to collect temperature measurements and provide those to the computer 14. The computer 14, in turn, determines whether the temperature values indicate that an item or location is associated with an out of range temperature. At predetermined intervals, or in response to user commands from the computer 14, the remote transmitters 68 may enter a calibration mode and sample fixed values. These fixed values are compared to stored values. If the fixed values differ from the stored values by more than a predetermined amount, such as a user-specified amount, the remote transmitters 68 are determined to be faulty and/or malfunctioning.

While this invention has been illustrated by a description of various preferred embodiments and while these embodiments have been described in considerable detail in order to describe the best mode of practicing the invention, it is not the intention of the inventor to restrict or in any way limit the scope of the appended claims to such detail. Additional advantages and modifications within the spirit and scope of the invention will readily appear to those skilled in the art. For example, in the described embodiment, the probe 22 and the sensors 54, 66, 76, 88 are used to measure and track temperature. As such, one or more of the probe 22 or the sensors 54, 66, 76, 88 may be, for example, a temperature sensing integrated circuit device, a resistance-measuring temperature device (such as a thermistor), a voltage-measuring temperature device (such as a thermocouple), or a radiated energy-measuring temperature device (such as an infrared detector), to name a few examples. However, in alternative embodiments, any of the probe 22 and sensors 54, 66, 76, 88 may be used to monitor and track any other desired condition or state of an item or environment. For example, sensor 66 and sensor 88 may be used to sense pressure, force, airflow, weight, etc. Transducers capable of sensing such conditions are commercially available. In those alternative embodiments, the calibration device 82 may include transducers that are similar to those used in the sensor 66 and sensor 88.

Moreover, in one described embodiment, the communications link 16 may be an RF wireless link in combination with an Ethernet link or hub. As will be appreciated, either the wireless link and/or the Ethernet hub can be replaced by any other known communications links, for example, a serial line, hard wiring, etc. Still further, reference has been made to a single data collector 12 and a single remote transmitter 68 as illustrated in FIG. 1. However, as will be appreciated, the monitoring and tracking system 10 may be configured with a plurality of data collectors 12 and a plurality of remote transmitters 68. The monitoring and tracking system 10 is also described with respect to a healthcare facility. As will be appreciated, the monitoring and calibration system 10 may be used in other applications unrelated to the healthcare industry.

Therefore, the invention in its broadest aspects is not limited to the specific detail shown and described. Consequently, departures may be made from the details described herein without departing from the spirit and scope of the claims which follow.

From the above disclosure of the general principles of this invention and the preceding detailed description of at least one embodiment, those skilled in the art will readily comprehend the various modifications to which this invention is susceptible. Therefore, I desire to be limited only by the scope of the following claims and equivalents thereof.

I claim:

1. A system for monitoring and tracking temperatures of an item, the system comprising:
    a temperature measuring device, the temperature measuring device configured to measure a first temperature associated with the item;
    a computer configured to receive and store the first temperature, the computer further configured to associate the first temperature with the item such that a record of the temperature of the item is maintained; and
    a calibration unit coupled to the temperature measuring device, the calibration unit configured to provide at least one fixed, known value to the computer,
    wherein the computer is configured to determine whether the at least one fixed, known value is outside a range from at least one respective expected value.

2. The system of claim 1, wherein the computer is configured to receive the first temperature via a wireless transmission.

3. The system of claim 2, wherein the wireless transmission is an RF transmission.

4. The system of claim 2, wherein the wireless transmission is a line-of-sight transmission.

5. The system of claim 1, wherein the computer is configured to receive the first temperature via a wired transmission.

6. The system of claim 5, wherein the wired transmission is facilitated through an Ethernet hub.

7. The system of claim 1, wherein the temperature sensing device further comprises:
    a temperature sensor;
    a conditioning circuit; and
    a transceiver,
    wherein the temperature sensing device is configured to transmit a second temperature associated with an environment to the computer.

8. The system of claim 7, wherein the environment is selected from a group consisting of a storage device, a freezer, a deep chiller, a refrigerator, and combinations thereof.

9. The system of claim 1, wherein the temperature sensing device is configured to periodically sample the at least one fixed, known value of the calibration unit.

10. The system of claim 1, wherein the computer is configured to send a command to the temperature sensing device to sample the at least one fixed, known value of the calibration unit.

11. The system of claim 1, wherein the calibration unit comprises:
    at least one resistor with a fixed, known resistance value.

12. The system of claim 1, wherein the computer is further configured to indicate that there is an error with the temperature sensing device in response to determining that the at least one fixed, known value is outside the range from the at least one respective expected value.

13. The system of claim 1, wherein the at least one fixed, known value is provided to the computer via the temperature measuring device.

14. A method of monitoring and tracking temperatures of an item, the method comprising:
- measuring a first temperature associated with the item with a temperature measuring device;
- transmitting the first temperature from the temperature measuring device to a computer;
- storing, at the computer, the first temperature and associating the first temperature with the item such that a record of the temperature of the item is maintained;
- transmitting at least one fixed, known value of a calibration unit coupled to the temperature measuring device from the temperature measuring device to the computer; and
- determining, at the computer, whether the at least one fixed, known value is outside a range from at least one respective expected value.

15. The method of claim 14, further comprising:
periodically sampling the at least one fixed, known value.

16. The method of claim 15, wherein the period between samplings is selected from a group consisting of daily, weekly, bi-weekly, monthly, and combinations thereof.

17. The method of claim 14, further comprising:
sampling the at least one fixed, known value in response to receiving a command from the computer to sample the at least one fixed, known value.

18. The method of claim 14, wherein the calibration unit includes at least one resistor with a fixed, known resistance value.

19. The method of claim 14, wherein the calibration unit is incorporated into the temperature measuring device.

20. The method of claim 14, wherein the calibration unit is a stand-alone unit, the method further comprising:
positioning the calibration unit in a communication path between a temperature sensor and a transmitter of the temperature measuring device.

21. The method of claim 20, further comprising:
bypassing the temperature sensor;
providing the at least one known, fixed value to the temperature sensing device; and
transmitting the at least one known, fixed value to the computer.

22. The method of claim 14, further comprising:
detecting a nonconformance of the first temperature with respect to a specified temperature for the item; and
providing an alert signal in response to detecting the nonconformance.

23. The method of claim 14, further comprising:
in response to determining that the at least one fixed, known value is outside the range from the at least one respective expected value, indicating that there is an error with the temperature sensing device.

* * * * *